(12) United States Patent
Nose

(10) Patent No.: US 9,007,645 B2
(45) Date of Patent: Apr. 14, 2015

(54) RECORDING MEDIUM AND PRINTED MATTER PRODUCING METHOD

(71) Applicant: Brother Kogyo Kabushiki Kaisha, Nagoya-shi, Aichi-ken (JP)

(72) Inventor: Tetsuya Nose, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/230,357

(22) Filed: Mar. 31, 2014

(65) Prior Publication Data

US 2014/0347689 A1   Nov. 27, 2014

(30) Foreign Application Priority Data

May 24, 2013   (JP) ................................. 2013-109440

(51) Int. Cl.
*G06F 3/12* (2006.01)
*G06F 17/00* (2006.01)
*G06F 17/21* (2006.01)

(52) U.S. Cl.
CPC ............ *G06F 3/1243* (2013.01); *G06F 3/1204* (2013.01)

(58) Field of Classification Search
CPC ........... G06F 17/21; G06F 17/24; G06F 1/12; H04N 1/387; G06T 11/60
See application file for complete search history.

(56) References Cited

U.S. PATENT DOCUMENTS

| 7,934,154 B2 | 4/2011 | Kobashi et al. |
| 2005/0172221 A1* | 8/2005 | Kobashi et al. ............... 715/513 |
| 2008/0231885 A1* | 9/2008 | Truong et al. ................ 358/1.15 |
| 2009/0106649 A1* | 4/2009 | Nose ............................. 715/243 |

FOREIGN PATENT DOCUMENTS

| JP | 2005-216182 A | 8/2005 |
| JP | 2006-309473 A | 11/2006 |

* cited by examiner

*Primary Examiner* — Fred Guillermety
*Assistant Examiner* — Henok A Shiferaw
(74) *Attorney, Agent, or Firm* — Banner & Witcoff, Ltd.

(57) ABSTRACT

The disclosure discloses a non-transitory computer-readable recording medium storing a program for executing steps on a computer. An operation terminal that is connected to a printed matter producing apparatus comprising a memory configured to store a database comprising a plurality of records each allocating character string data to a plurality of fields. The steps comprise an information acquiring, an object data determining, a print data creating, and a print data outputting. In the information acquiring, identification information of the field comprising a reference character string data is acquired and a plurality of offset values relating to each of a plurality of pieces of print object data are acquired. In the object data determining, the plurality of pieces of print object data is determined by using the identification information and by applying the plurality of offset values, respectively.

5 Claims, 16 Drawing Sheets

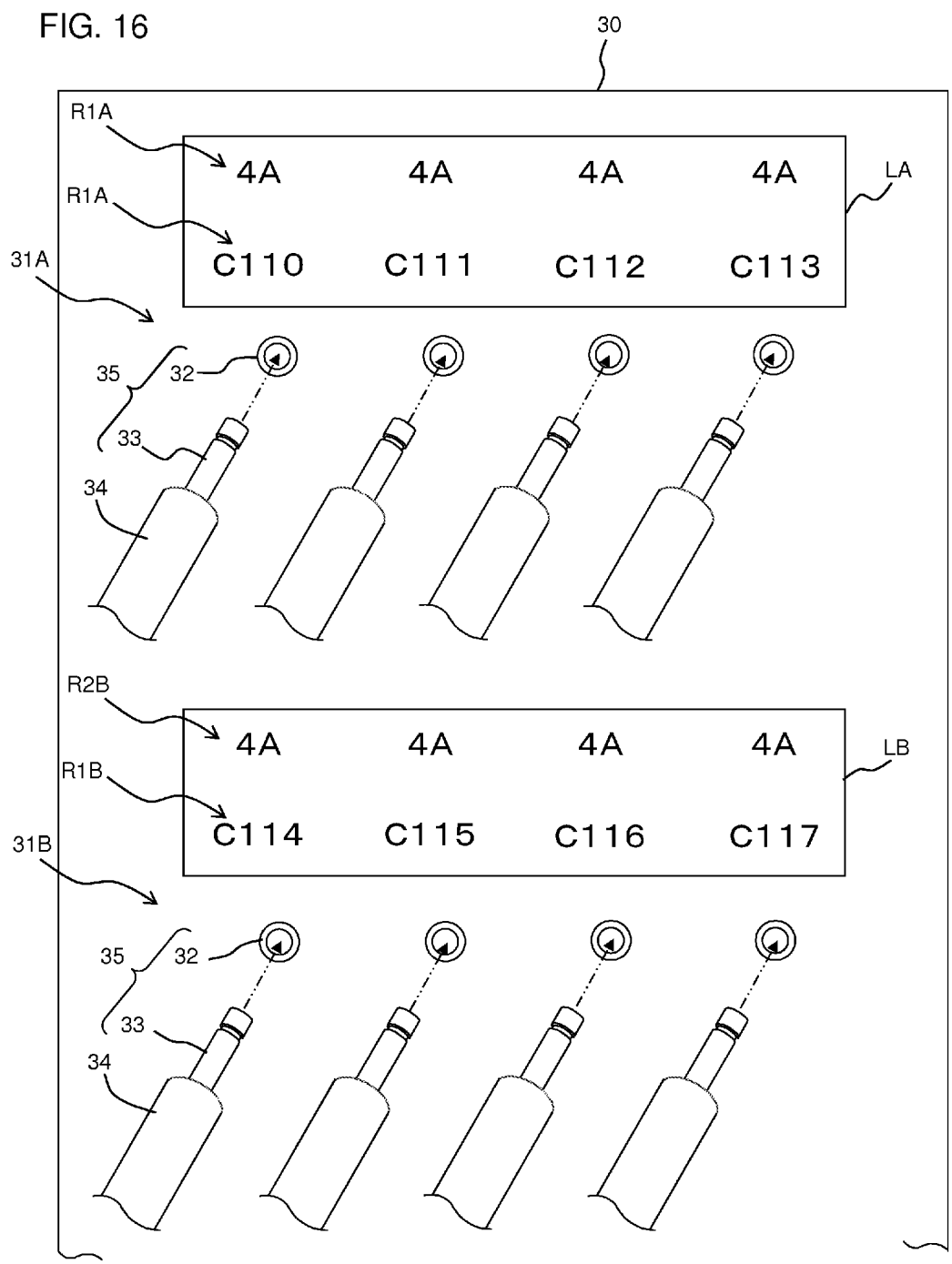

RECORDING MEDIUM AND PRINTED MATTER PRODUCING METHOD

CROSS-REFERENCE TO RELATED APPLICATION

The present application claims priority from Japanese Patent Application No. 2013-109440, which was filed on May 24, 2013, the disclosure of which is incorporated herein by reference in its entirety.

BACKGROUND

1. Field

The present disclosure relates to a recording medium storing a printed matter producing program for producing a printed matter and a printed matter producing method.

2. Description of the Related Art

A printed matter producing apparatus for producing a printed matter has been known. This printed matter producing apparatus (printing apparatus) is capable of so-called database printing in which contents of a character string allocated by a template are specified by a record of a database. When database printing is performed, a printed matter in which a plurality of character strings allocated to a plurality of fields, respectively, in the specified record of the database are allocated along the template is produced.

In the above described prior art, a plurality of pieces of character string data across a plurality of records can be printed as a plurality of print object included in one printed matter, respectively. However, in that case, a complicated operation of individually specifying a name of each record from which the character string data is acquired or a field name is needed, which is cumbersome.

SUMMARY

An object of the present disclosure is to provide a non-transitory computer-readable recording medium storing a printed matter producing program which can produce a printed matter by using the plurality of pieces of character string data across the plurality of records as the plurality of print objects with a simple operation and a printed matter producing method.

In order to achieve the above-described object, according to the aspect of the present application, there is provided a non-transitory computer-readable recording medium, storing a printed matter producing program for executing steps on a computer of an operation terminal, the operation terminal that is connected to a printed matter producing apparatus configured to produce one printed matter comprising a plurality of print objects by performing print on the basis of print data on a print-receiving medium being fed and is comprising a memory configured to store a database comprising a plurality of records each allocating character string data to a plurality of fields, a display device, and the steps comprising an information acquiring that acquires identification information of the field comprising a reference character string data included in one reference record which becomes an application reference to a plurality of pieces of print object data applied to a plurality of print objects to be printed on the printed matter, respectively, and for acquiring a plurality of offset values relating to each of the plurality of pieces of print object data to the reference character string data, an object data determining that determines the plurality of pieces of print object data by acquiring the reference character string data from the database by using the identification information acquired in the information acquiring and by applying the plurality of offset values acquired in the information acquiring to the reference record, respectively, a print data creating that creates the print data for printing the printed matter comprising the plurality of print objects on the basis of the plurality of pieces of print object data determined in the object data determining, and a print data outputting that outputs the print data created in the print data creating to the printed matter producing apparatus.

In the disclosure of the present application, an operation terminal includes a storage device (memory), a display device (device), and a calculation device (computer), and a database is stored in the storage device (memory). This database includes a plurality of records, and in each record, character string data is allocated to each of a plurality of fields. By connecting such operation terminal to a printed matter producing apparatus for use, the character string data included in the above described record is printed as the print object, and production of a printed matter (so-called database printing) is performed.

Here, in the disclosure of the present application, as the plurality of print objects included in one printed matter, the plurality of pieces of character string data across the plurality of records can be printed, respectively. At that time, by determining contents of the plurality of pieces of print object data applied to each of the plurality of print objects by using one piece of character string data (reference character string data) included in one record (reference record) as a reference and by using an offset value (deviation) with respect to the reference record, the plurality of pieces of character string data across the plurality of records can be printed substantially as the plurality of pieces of print object data, and one printed matter can be produced.

That is, if the printed matter producing program of the disclosure of the present application is executed by the calculation device (computer) of the operation terminal, first, in an information acquiring, identification information (field name and the like, for example, the same applies to the following) of the field in the database to which the reference character string data included in the reference record belongs is acquired. That is, when an operator inputs the identification information by operating an appropriate operating device (device) and the like of the operation terminal, the inputted identification information is acquired on the operation terminal side. Moreover, in the information acquiring, an offset value with respect to the reference record of each record including each of the print object data is also acquired. That is, for example, when the operator operates the appropriate operating device (device) and the like of the operation terminal and inputs the offset value, the inputted offset value is acquired on the operation terminal side.

Then, in an object data determining after the above described information acquiring, an access is made to the database by using the above described acquired identification information, and the reference character string data is acquired from the database. At the same time, by applying the plurality of offset values acquired as above to the reference record, respectively, the character string corresponding to each of the applied records is acquired, whereby the plurality of pieces of print object data are determined.

Subsequently, in a print data creating, print data including the plurality of pieces of print object data determined as above is created, and in a print data outputting, the created print data is further outputted to the printed matter producing apparatus.

As a result of the above, according to the disclosure of the present application, the plurality of pieces of character string data across the plurality of records stored in the database are printed as the plurality of print objects, respectively, and one printed matter can be produced with a simple operation. As a result, the print objects in which a plurality of numerals or symbols are consecutively juxtaposed in one printed matter such as print labels to be affixed to a plurality of cable connection portions (LAN port or cable jack, for example) and the like can be easily produced by database printing. As a result, convenience for the operator can be improved.

BRIEF DESCRIPTION OF THE DRAWING

FIG. 16 is an explanatory diagram illustrating a terminal connection portion of an electronic device to which the print label is affixed.

DETAILED DESCRIPTION OF THE PREFERRED EMBODIMENTS

Figure 1:
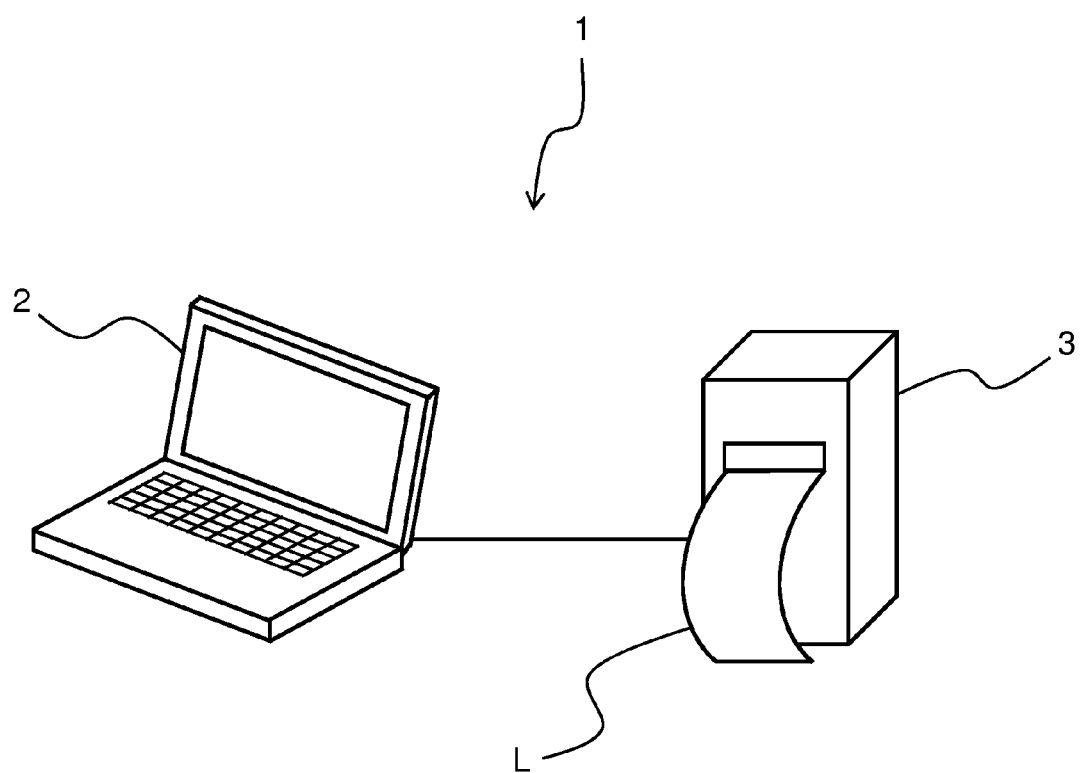
FIG. 1 is a system configuration diagram illustrating an entire printing system including an operation terminal according to a first embodiment of the present disclosure.

Embodiments of the present disclosure will be described below by referring to the attached drawings.
<First Embodiment>
A first embodiment of the present disclosure will be described by referring to FIGS. 1 to 12.
<System Outline Configuration>
As illustrated in FIG. 1, a printing system 1 according to the present embodiment has an operation terminal 2 configured by a general-purpose personal computer, for example, and a label printer 3 connected to the operation terminal 2 via wired connection such as a USB cable or the like, for example, or wireless communication, capable of transmitting/receiving information.

The label printer 3 transmits/receives various types of information and instruction signals to/from the operation terminal 2 and produces a print label L on which desired printing is applied on the basis of print data including desired characters, figures and the like transmitted from the operation terminal 2.

<Details of Operation Terminal and Label Printer>

Figure 2:
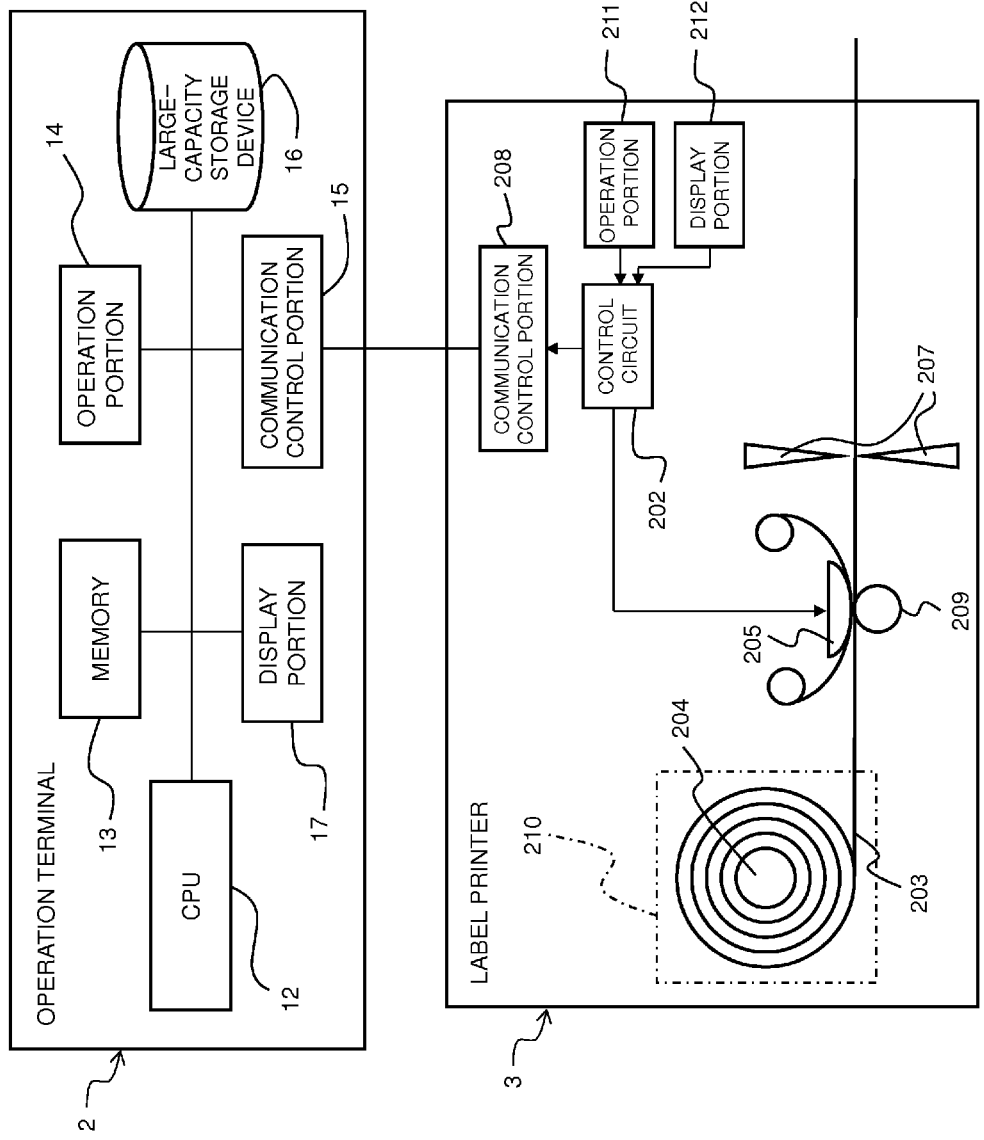
FIG. 2 is a functional block diagram illustrating detailed functions of the operation terminal and a label printer.

Detailed functions of the operation terminal 2 and the label printer 3 will be described by using FIG. 2. In FIG. 2, the operation terminal 2 includes a CPU 12, a memory 13 composed of a RAM, a ROM and the like, for example, an operation portion 14 composed of a keyboard, a mouse and the like into which an instruction or information is inputted from an operator, a display portion 17 for displaying various types of information or a message, a large-capacity storage device 16 composed of a hard disk device, for example, and storing various types of information, and a communication control portion 15 for controlling transmission/reception of an information signal with the label printer 3 via interface connection in compliance with a standard such as USB, for example.

The CPU 12 executes signal processing in accordance with a program (a printed matter producing program executing a flow illustrated in FIG. 8 which will be described later) stored in advance in the ROM while using a temporary storage function of the RAM. The CPU 12 transmits/receives various types of instruction signals/information signals with the label printer 3 through the above described signal processing.

On the other hand, the label printer 3 has a tape roll holder portion 210 with which a tape roll 204 having a printing tape 203 wound therearound is detachably attached (or a cartridge including the tape roll 204 can be detachably attached), a print head 205 performing printing on the basis of desired print data on the printing tape 203 fed out of this tape roll 204, a cutter 207 for cutting the printing tape 203 finished with printing to a predetermined length so as to have the print label L, a feeding roller 209 disposed by being faced with the print head 205 and feeding the printing tape 203 fed out of the tape roll 204, an operation portion 211 for receiving a desired operation input by the operator, and a display portion 212 on which predetermined display is made.

The print head 205 is connected to a control circuit 202 through a print-head driving circuit (not shown). The feeding roller 209 is connected to a feeding motor (not shown), and this feeding motor is connected to the control circuit 202 through a feeding motor driving circuit (not shown). The cutter 207 is connected to the control circuit 202 through an actuator for operating the cutter (not shown) such as a solenoid. Moreover, the control circuit 202 is connected to the communication control portion 15 of the operation terminal 2 through the communication control portion 208, so that information can be sent to/received from the operation terminal 2.

<Database Printing>

Figure 3:
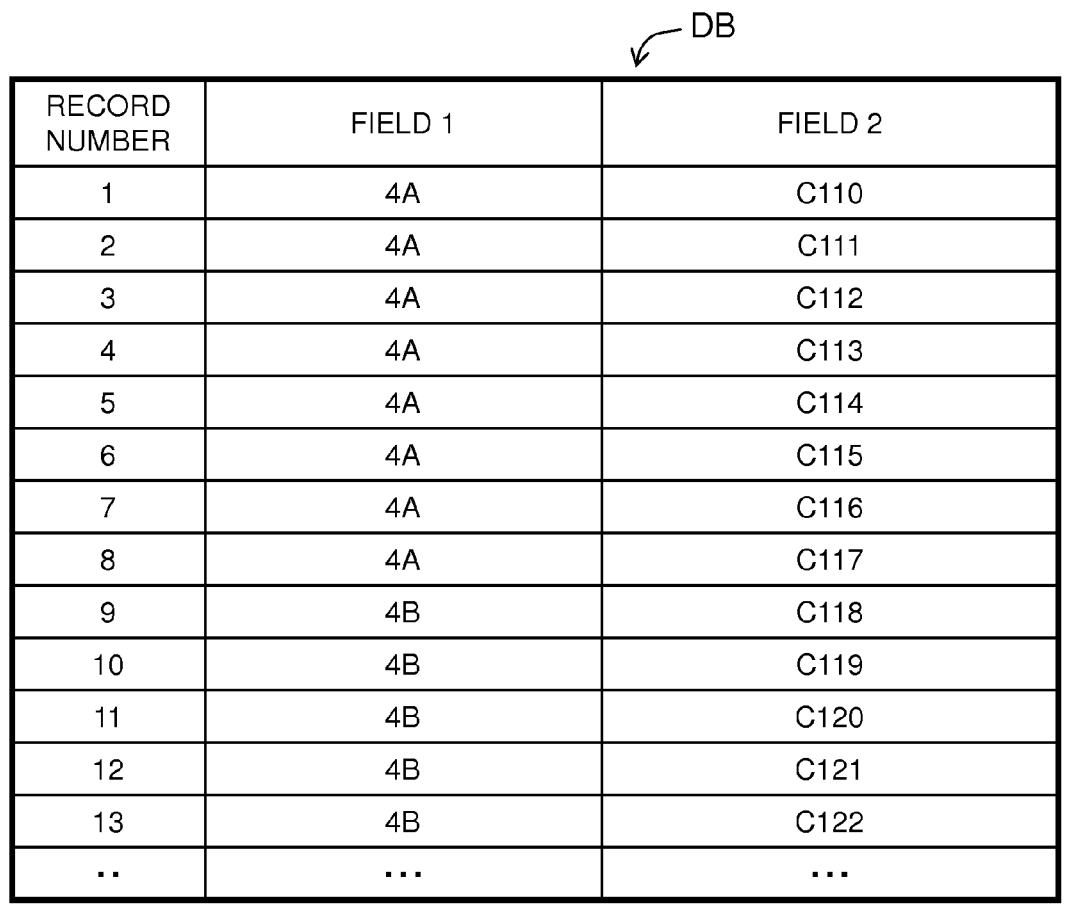
FIG. 3 is an explanatory diagram illustrating an example of stored contents of a database stored in a large-capacity storage device of the operation terminal.

In the large-capacity storage device 16 of the operation terminal 2, a database DB including a plurality of records to each of which a character string is allocated, respectively, is stored in this example. FIG. 3 illustrates an example of this database DB. In the example illustrated in FIG. 3, in the database DB, in the case of a record with a record number "1", for example, a character string "4A" indicating a model name of an electronic device, for example (see FIG. 4 and the like which will be described later. The same applies to the following), is allocated as storage contents of a field 1, and a character string "C110" indicating a connector name, for example (see FIG. 4 and the like which will be described later. The same applies to the following), is allocated as storage contents of a field 2.

Similarly, in a record with a record number "2", the character string "4A" similar to the above is allocated as storage contents of the field 1, and a character string "C111" is allocated as storage contents of the field 2. In a record with a record number "3", the character string "4A" similar to the above is allocated as storage contents of the field 1, and a character string "C112" is allocated as storage contents of the field 2. In a record with a record number "4", the character string "4A" similar to the above is allocated as storage contents of the field 1, and a character string "C113" is allocated as storage contents of the field 2. In a record with a record number "5", the character string "4A" similar to the above is allocated as storage contents of the field 1, and a character string "C114" is allocated as storage contents of the field 2. In a record with a record number "6", the character string "4A" similar to the above is allocated as storage contents of the field 1, and a character string "C115" is allocated as storage contents of the field 2. In a record with a record number "7", the character string "4A" similar to the above is allocated as storage contents of the field 1, and a character string "C116" is allocated as storage contents of the field 2. In a record with a record number "8", the character string "4A" similar to the above is allocated as storage contents of the field 1, and a character string "C117" is allocated as storage contents of the field 2.

Moreover, in a record with a record number "9", a character string "4B" indicating a model name of an electronic device, for example, similarly to the above is allocated as storage contents of the field 1, and a character string "C118" indicating a connector name, for example (see FIG. 16 and the like which will be described later. The same applies to the following) is allocated as storage contents of the field 2. Similarly, in a record with a record number "10", the character string "4B" similar to the above is allocated as storage contents of the field 1, and a character string "C119" is allocated as storage contents of the field 2. In a record with a record number "11", the character string "4B" similar to the above is allocated as storage contents of the field 1, and a character string "C120" is allocated as storage contents of the field 2. In a record with a record number "12", the character string "4B" similar to the above is allocated as storage contents of the field 1, and a character string "C121" is allocated as storage contents of the field 2. In a record with a record number "13", the character string "4B" similar to the above is allocated as storage contents of the field 1, and a character string "C122" is allocated as storage contents of the field 2.

When the printed matter producing program is executed in the CPU 12 of the operation terminal 2, the plurality of records in the database DB are sequentially specified, and the character string data of the specified records is read out. Then, in the label printer 3, the feeding roller 209 feeds the printing tape 203, the print head 205 applies printing of the print data corresponding to the character string data read as above and transmitted from the operation terminal 2 on the printing tape 203, and the print label L is produced (see FIG. 6 which will be described later). As described above, so-called database printing in which the contents of the character strings printed on the printing tape 203 is specified by the record in the above described database DB is performed.

<Terminal Connection Portion of Electronic Device and Print Label>

As described above, each record of the database DB of the present embodiment is used for producing the print label L for expressing the connector to be connected to a terminal connection portion of the electronic device, for example. An example of the terminal connection portion of the electronic device to which this print label L is affixed will be described by referring to FIG. 4.

Figure 4:
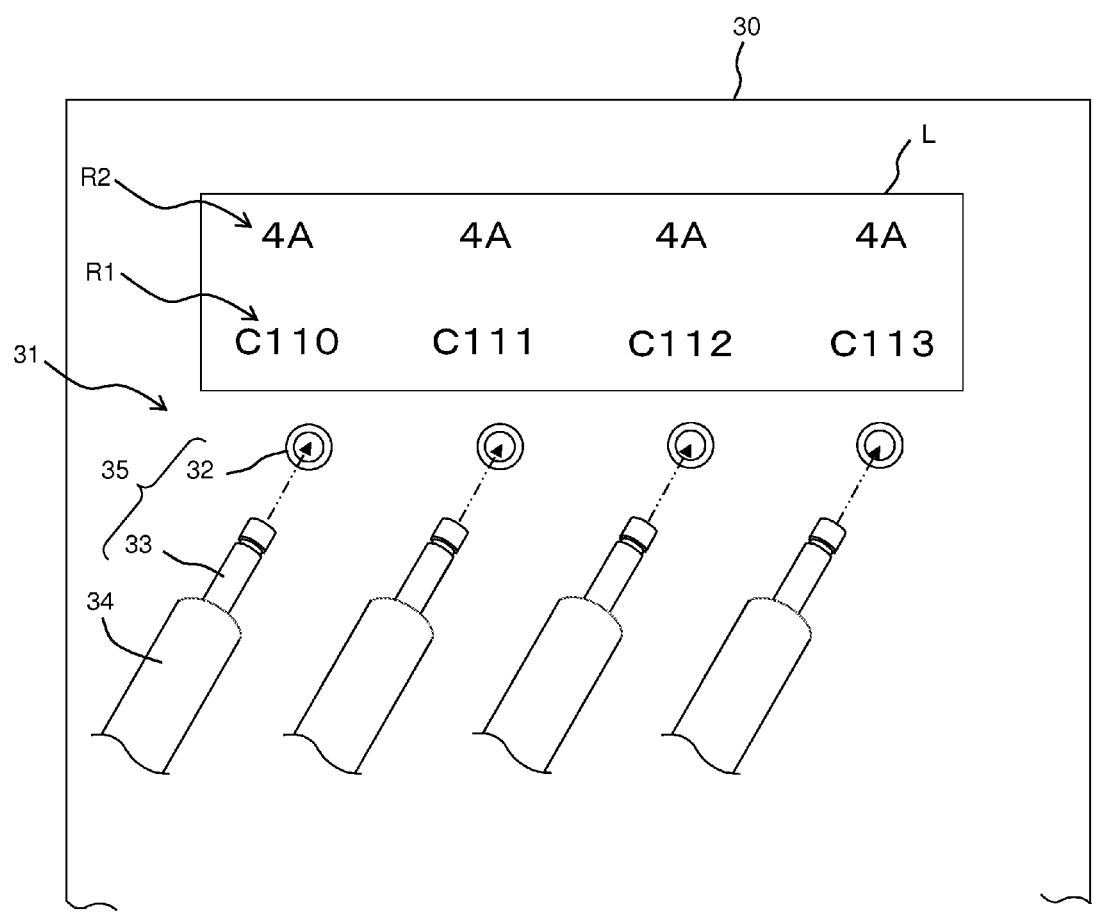
FIG. 4 is an explanatory diagram illustrating a terminal connection portion of an electronic device to which a print label is affixed.

FIG. 4 is an explanatory diagram illustrating the terminal connection portion 31 of the electronic device 30, for example. On the terminal connection portion 31 of the electronic device 30 (the model name in this example is "4A"), a jack 32 of each of four connectors 35 is installed at intervals in a width direction (right-and-left direction in FIG. 4) of the electronic device 30. A plug 33 (disposed on a tip end of each cable 34) of each of the four connectors 35 is connected to the corresponding jack 32.

At this time, the names of the above described four connectors are "C110", "C111", "C112" and "C113" in order from the left in this example. In response to that, a single sheet of the print label L which is long in the width direction of the electronic device 30 is affixed immediately above the row of the four jacks 32 of the terminal connection portion 31. This print label L is to express the names of the four connectors.

That is, in the print label L, a print R1 is formed at a position corresponding to the jack 32 on a lower stage in a label width direction (vertical direction in FIG. 4), and a print R2 is formed on an upper stage in the label width direction. In this example, the print R1 includes four character strings of "C110", "C111", "C112" and "C113" indicating the names of the connectors 35 as a plurality of (four in this example) print objects, and these character strings are arranged in this order from the left side to the right side in a longitudinal direction. That is, it indicates that the four connectors 35 composed of the jacks 32 and the plugs 33 are the connectors with the names "C110", "C111", "C112" and "C113" from the left side in the longitudinal direction in this order.

Moreover, the print R2 of the print label L includes four character strings of "4A" indicating the model name of the electronic device as the plurality of (four in this example) print objects. That is, it indicates that the connectors 35 with the above described names "C110", "C111", "C112" and "C113" are all the connectors of the electronic device with the model name "4A".

By affixing such print label L to the terminal connection portion 31 of the electronic device 30, which connector of what electronic device the connector 35 is can be visually checked by looking at the prints R1 and R2 of the print label L. Therefore, the plug 33 with correct combination for the jack 32 can be easily selected and connected.

Returning to FIG. 3, each of the records in the database DB is to express the connectors 35 used in the electronic devices 30 with the model names "4A", "4B" and the like as exemplified in FIG. 4. Thus, as described above, in the database DB, the character strings such as "4A", "4B" and the like indicating the model name of the electronic device are stored in the field 1 of the plurality of records, and the character strings such as "C110", "C111" and the like indicating the connector names in the electronic device with the applicable model name are stored in the field 2.

<Feature of the Present Embodiment>

In the above, a feature of the present embodiment is that the plurality of pieces of character string data across the plurality of records in the database DB can be printed as the plurality of print objects included in one print label L, respectively. In the above described example, as illustrated in FIGS. 4 and 3, in the print R1 on the lower stage of the print label L in FIG. 4, the character strings "C110", "C111", "C112" and "C113" in the field 2 of each of records with the record numbers "1", "2", "3", and "4" in the database DB illustrated in FIG. 3 are used and formed. At that time, in order to specify contents of the plurality of pieces of character string data to be applied to each of the plurality of print objects, the field of each record and the like needs to be individually specified in the prior-art method, but in the present embodiment, a method different from the above described prior-art method is used. That is, in the present embodiment, when the operator inputs a record offset value (deviation. The details will be described later) with respect to one reference record, the contents of each character string data are determined. The details will be described below in sequence.

<Input Screen>

In order to perform the above described method, an example of the display screen of the operation terminal 2 displayed for input of the offset value and the like will be described by using FIG. 5.

Figure 5:
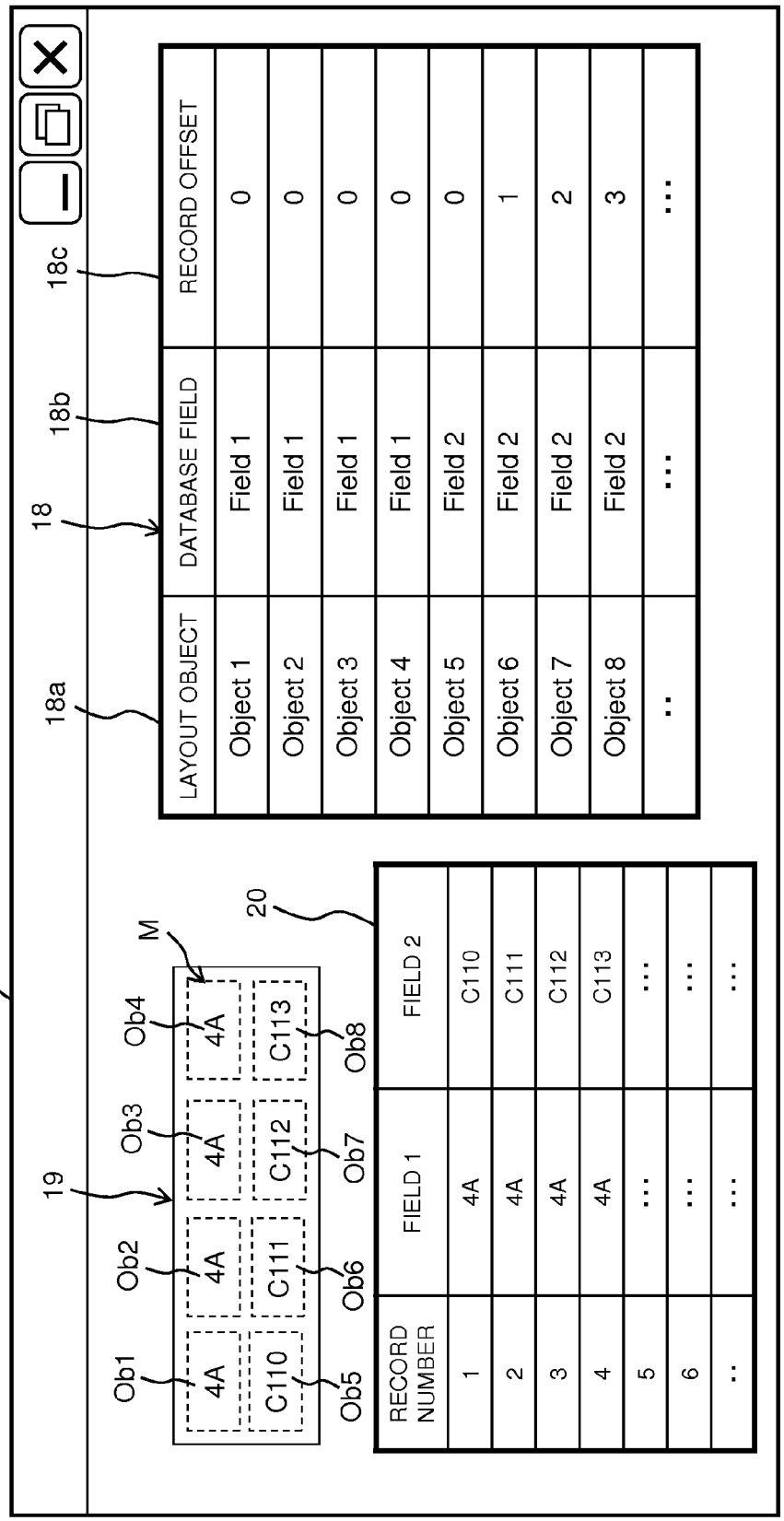
FIG. 5 is an explanatory diagram illustrating an example of a display screen (including an input screen) displayed on a display portion of the operation terminal.

FIG. 5 illustrates a display screen 17A displayed on the display portion 17 of the operation terminal 2. This display screen 17A includes an input screen 18 into which the operator inputs the above described record offset value and the like, and a preview screen 19 of the print label L to be edited with an input on the input screen 18 and a database screen 20 displaying contents of the database DB.

The input screen 18 includes a layout object column 18a, a database field column 18b, and a record offset column 18c.

In the layout object column 18a, identification information of the plurality of print objects (number and arrangement have been already set by an appropriate editing operation) included in a label image M (see the preview screen 19) of the print label L to be produced is automatically written in order. In this example, as illustrated in the preview screen 19, four print objects Ob1 (written as "Object1" in the layout object column 18a. The same applies to the following), the print object Ob2, the print object Ob3, and the print object Ob4 are arranged from left to right on the upper stage along the label width direction in the label image M, and four print objects Ob5, Ob6, Ob7, and Ob8 are arranged from left to right on the lower stage along the label width direction. In association with them, eight terms, "Object 1", "Object 2", "Object 3", "Object 4", "Object 5", "Object 6", "Object 7", and "Object 8" are automatically written in the layout object column 18a.

In the database field column 18b, the operator inputs the identification information of the field of the database DB (the field name in this example) in association with the layout object column 18a. In line with the above described example, as illustrated in FIG. 3 and the database screen 20, the field names of the database DB which the operator wants to apply to each of the print objects Ob1 to Ob8 of the label image M, that is, "Field1" or "Field2" is inputted in this database field column 18b (the details will be described later). The input in this database field column 18b is made by the operator by using the operation portion 14 of the operation terminal 2.

In the record offset column 18c, in association with the written contents of the layout object column 18a and the contents inputted by the operator in the database field column 18b, an offset value to the reference record (which will be described later) of the record in the database DB which the operator wants to apply to each of the print objects Ob1 to Ob8 in the label image M (the details will be described later) is inputted. The input in this record offset column 18c is made by the operator by using the operation portion 14 of the operation terminal 2.

<Flow of Input in Input Screen>

Subsequently, a flow of inputs in the input screen 18 illustrated in FIG. 5 will be described in order using a case in which the print label L (see FIG. 6) which is the same as that illustrated in FIG. 4 is produced as an example.

As described above, the operator refers to the contents of the database DB on the database screen 20 (that is, the character strings in the field 1 and the field 2 by the record number) and sequentially inputs the field name of the record having the character string data to be applied to each of the print objects Ob1 to Ob8 of the label image M in the database field column 18b. At that time, if the record is different from the reference record (which will be described later), deviation between the record number of the record and the record number of the reference record is inputted as the offset value in the record offset column 18c. An input result is reflected in the label image M on the preview screen 19, and thus, the operator can make the above described input while checking the label image M and edit the layout of the print label L to be produced by the database printing.

Figure 6:
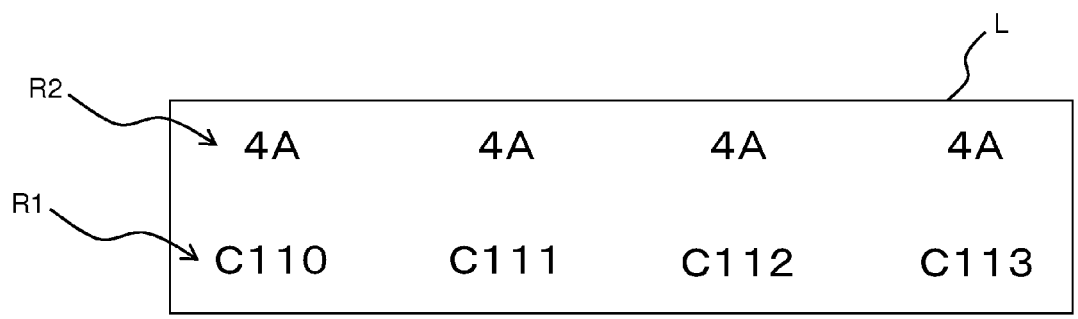
FIG. 6 is an explanatory diagram illustrating a print label thus produced.

As described above, in this example, the print label L to be produced has, as illustrated in FIG. 6, the character string "4A" (corresponding to the print object Ob1 of the label image M in FIG. 5), the character string "4A" (corresponding to the print object Ob2 similarly to the above), the character string "4A" (corresponding to the print object Ob3 similarly to the above), and the character string "4A" (corresponding to the print object Ob4 similarly to the above) indicating the model names of the electronic device 30, respectively, formed from left to right on the upper stage in the label width direction (vertical direction in FIG. 6) and the character string "C110" (corresponding to the print object Ob5 of the label image M in FIG. 5), the character string "C111" (corresponding to the print object Ob6 similarly to the above), the character string "C112" (corresponding to the print object Ob7 similarly to the above), and the character string "C113" (corresponding to the print object Ob8 similarly to the above) indicating the names of the connectors 35, respectively, formed from left to right on the lower stage of the label width direction (vertical direction in FIG. 6).

<Application of Character String Data to Print Object Ob1>

As described above, the character string "4A" should be applied to the print object Ob1 of the label image M in this example. Thus, the operator first inputs "Field1" as a database field in the database field column 18b corresponding to "Object1" of the layout object column 18a. Then, the operator inputs "0" as a record offset value in the record offset column 18c corresponding to "Object1" of the layout object column 18a (see the input screen 18 in FIG. 5).

At this time, in this example, the record with the record number "1" (that is, the character string "4A" has been stored in the field 1 and the character string "C110" in the field 2) in the database DB is set as the reference record in advance. This reference record refers to a record to become an application reference to the plurality of pieces of character string data (the character string "4A", the character string "C110", the character string "C111", the character string "C112", and the character string "C113" in this example) to be applied to the plurality of print objects, respectively, printed on the print label L. As a result, as will be described later, the other records (each of the records with the record numbers "2" to "4" and the like) can be specified by the record offset value with the reference record (without specification using the record number itself). In this example, with respect to the record with the record number "1", the record offset value relating to the record with the record number "2" becomes 1, the record offset value relating to the record with the record number "3" becomes 2, and the record offset value relating to the record with the record number "4" becomes 3 (the same applies to the other record numbers). The record offset value relating to the record with the record number "1" is 0.

By means of the input by the operator as described above, to the print object Ob1, the character string data "4A" of the field 1 in the record with the record number "1" displayed on the database screen 20 is applied (the label image M on the preview screen 19 in FIG. 5 illustrates the state after this application).

<Application of Character String Data to Print Objects Ob2, Ob3, and Ob4>

As described above, the character string "4A" should be applied to each of the print objects Ob2, Ob3, and Ob4 of the label image M similarly to the print object Ob1 in this example. Thus, the operator inputs "Field1" as the database field in the database field columns 18b corresponding to "Object2", "Object3", and "Object4" in the layout object columns 18a, respectively and also inputs "0" as the record offset value in the record offset columns 18c (see the input screen 18 in FIG. 5). As a result, to the print objects Ob2, Ob3, and Ob4, the character string data "4A" of the field 1 in the record with the record number "1" displayed on the database screen 20 is applied, respectively (the label image M on the preview screen 19 in FIG. 5 illustrates a state after this application).

<Application of Character String Data to Print Object Ob5>

As described above, the character string "C110" should be applied to the print object Ob5 of the label image M in this example. Thus, the operator inputs "Field2" as the database field in the database field column 18b corresponding to "Object5" in the layout object column 18a and also inputs "0" as the record offset value in the record offset column 18c (see the input screen 18 in FIG. 5). As a result, to the print object Ob5, the character string data "C110" of the field 2 in the record with the record number "1" displayed on the database screen 20 is applied, respectively (the label image M on the preview screen 19 in FIG. 5 illustrates a state after this application).

<Application of Character String Data to Print Object Ob6>

As described above, the character string "C111" should be applied to the print object Ob6 of the label image M in this example. Thus, the operator inputs "Field2" as the database field in the database field column 18b corresponding to "Object6" in the layout object column 18a and also inputs "1" as the record offset value in the record offset column 18c (see the input screen 18 in FIG. 5). As a result, to the print object Ob6, the character string data "C111" of the field 2 in the record with the record number "2" displayed on the database screen 20 (a value acquired by adding an offset value 1 to the record number "1" of the reference record) is applied (the label image M on the preview screen 19 in FIG. 5 illustrates a state after this application).

<Application of Character String Data to Print Objects Ob7 and Ob8>

As described above, the character strings "C112" and "C113" should be applied to the print objects Ob7 an Ob8 of the label image M, respectively, in this example. Thus, the operator inputs "Field2" as the database field in the database field columns 18b corresponding to "Object7" and "Object8", respectively, in the layout object columns 18a and also inputs "2" and "3" as the record offset values in the record offset columns 18c, respectively (see the input screen 18 in FIG. 5). As a result, to the print objects Ob7 and Ob8, the character string data "C112" and "C113" of the field 2 in each of the records with the record numbers "3" and "4" displayed on the database screen 20 is applied, respectively (the label image M on the preview screen 19 in FIG. 5 illustrates a state after this application).

As described above, the result of input performed by the operator (field name and record offset value) is acquired by the CPU 12 of the operation terminal 2 and stored in the memory 13 temporarily, for example.

<Setting Screen>

When inputs into the input screen 18 of the display screen 17A is finished as above, an input into the setting screen for making final setting for actual printing of the print label L is performed.

Figure 7:
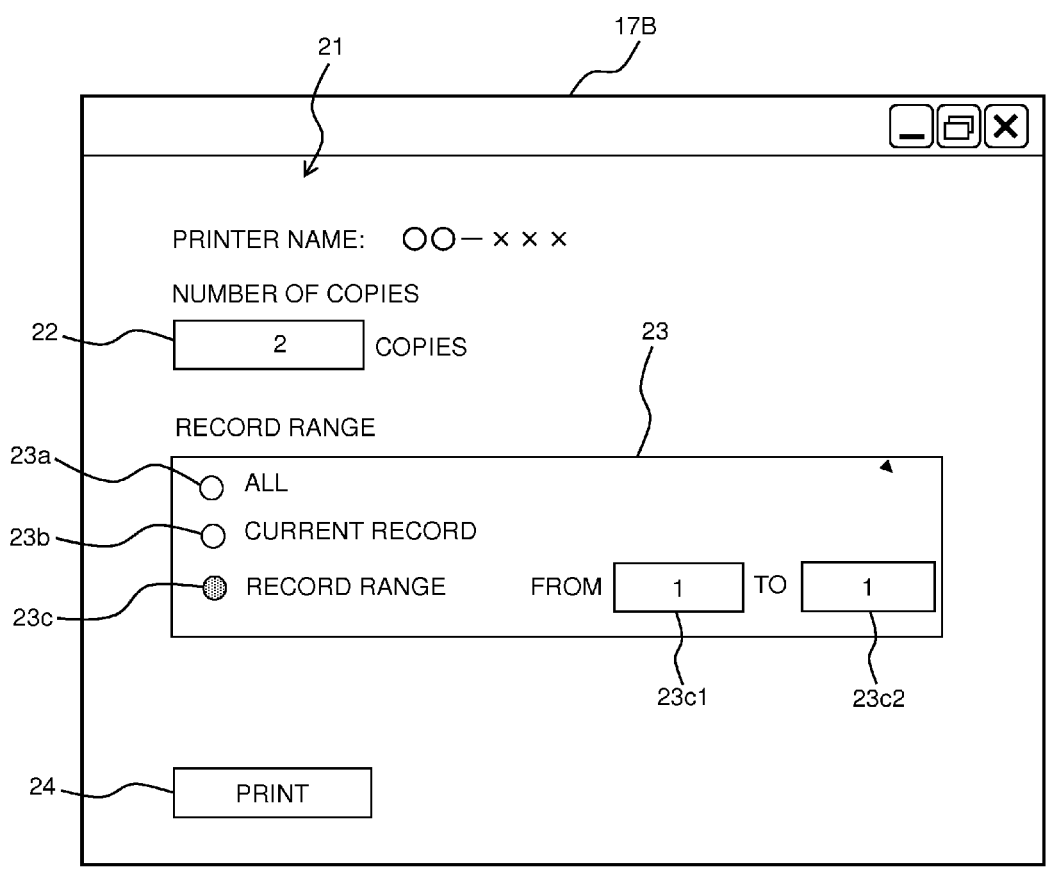
FIG. 7 is an explanatory diagram illustrating an example of the display screen (including a setting screen) displayed on the display portion of the operation terminal.

FIG. 7 illustrates a display screen 17B displayed on the display portion 17 of the operation terminal 2. This display screen 17B includes a setting screen 21 for the operator to make the above described various settings.

The setting screen 21 includes a copy number column 22, a record number range setting column 23, and a printing button 24 for instructing print of the print label L.

In the copy number column 22, the number of sets (=number of copies. Two in the illustrated example) of the print labels L to be produced by the database printing performed as above is inputted by the operator. The input into this copy number column 22 is made by the operator by using the operation portion 14 of the operation terminal 2.

In the record number range setting column 23, the range of the number of records to be used as the reference record when the database printing is performed on the basis of the input contents on the input screen 18 is selected or inputted by the operator. The input into this record number range setting column 23 is performed by the operator by using the operation portion 14 of the operation terminal 2. In detail, the record number range setting column 23 includes selection display portions 23a, 23b, and 23c, and input columns 23c1 and 23c2.

The selection display portion 23a is for selecting the whole range (all the records) as the record number range of the above described reference record. In this case, all the records included in the database DB are used sequentially as the above described reference record.

The selection display portion 23b is for selecting only one record specified at that time as the record number range of the reference record. In this case, only the specified one record is used as the reference record.

The selection display portion 23c is selected for specifying the record number range of the reference record by inputting a numeral value of a specific record number.

In the example illustrated in FIG. 7, by means of the operation input by the operator using the operation portion 14, a numeral value "1" is inputted into the input columns 23c1 and 23c2, respectively. As a result, in the plurality of records in the database DB, only the record with the record number "1" is used as the reference record. That is, by means of the operation of the printing button 24 by the operator, the print data (print data including the character string data "4A", "4A", "4A", and "4A" and the character strings "C110", "C111", "C112", and "C113" data) for the database printing using the record number "1" as the reference record is created, and the print data is outputted to the printer 3. Then, the print label L illustrated in FIG. 6 on which the print R1 (including the character strings "4A", "4A", "4A", and "4A") and the print R2 (including the character strings "C110", "C111", "C112", and "C113") are printed is produced by the printer 3.

<Control Procedure on Operation Terminal>

In order to realize the above, a processing procedure of the printed matter producing method executed by the CPU 12 of the operation terminal 2 on the basis of the printed matter producing program will be described by referring to FIG. 8.

First, at Step S10, the CPU 12 outputs a display control signal to the display portion 17 and displays the display screen 17A including the input screen 18 for prompting inputs of the field name, the offset value and the like, the preview screen 19, and the database screen 20 on the display portion 17. When Step S10 is finished, the routine proceeds to Step S20.

At Step S20, the CPU 12 receives and acquires the field names, record offset values and the like inputted by the operator through the operation portion 14 as described above into the database field columns 18b and the record offset columns 18c of the input screen 18. That is, in the example in FIG. 5 described above, "Field1", "Field2" and the like inputted in the database field columns 18b are received, and numeral values of the record offset values "0", "1", "2", "3" and the like inputted in the record offset columns 18c are received. When Step S20 is finished, the routine proceeds to Step S30.

At Step S30, the CPU 12 outputs a display control signal to the display portion 17 and displays the display screen 17B including the record number range setting column 23 and the like on the display portion 17. When Step S30 is finished, the routine proceeds to Step S40.

At Step S40, the CPU 12 receives and acquires setting of the record number range or numeral values and the like inputted by the operator by using the operation portion 14 as described above into the record number range setting column 23 of the setting screen 21. That is, in the example illustrated in FIG. 7 described above, the numeral values "1" inputted as the record number range into the input columns 23c1 and 23c2 of the selection display portion 23c of the record number range setting column 23 are received. When Step S40 is finished, the routine proceeds to Step S50.

At Step S50, the CPU 12 makes an access to the database DB by using the field name and the plurality of offset values acquired at Step S20 and acquires the character string data stored in the corresponding field of the corresponding record so as to determine all the character string data to be formed on the print label L. That is, the CPU 12 refers to each record stored in the database DB and acquires the reference character string data (the character string data "4A" and "C110" in the above described example) from the reference record (the record with the record number "1" in the above described example) of the database DB by using the acquired field name. Moreover, the CPU 12 applies the plurality of offset values acquired as above to the reference record, respectively, acquires the character string data (the character string data "C111", "C112", and "C113" in the above described example) corresponding to each of the applied records (the records with the record numbers "2", "3" and "4" in the above described example) and determines all the character string data (the character string data "4A", "4A", "4A", "4A", "C110", "C111", "C112", and "C113" in the above described example) by them. When Step S50 is finished, the routine proceeds to Step S60.

At Step S60, the CPU 12 determines whether or not a printing instruction has been made by the operator (that is, whether or not the printing button 24 has been pressed). The determination is not satisfied until the operator makes a printing instruction (Step S60: NO), and the routine waits in a loop. If the printing instruction has been made, the determination is satisfied (Step S60: YES), the routine proceeds to Step S70.

At Step S70, the CPU 12 creates print data for printing a corresponding character string on the printing tape 203 on the basis of the plurality of pieces of character string data determined at Step S50. When Step S70 is finished, the routine proceeds to Step S80.

At Step S80, the CPU 12 outputs the print data created at Step S70 to the label printer 3 through the communication control portion 15. After Step S80 is completed, this flow is finished.

<Control Procedure in Label Printer>

Figure 9:
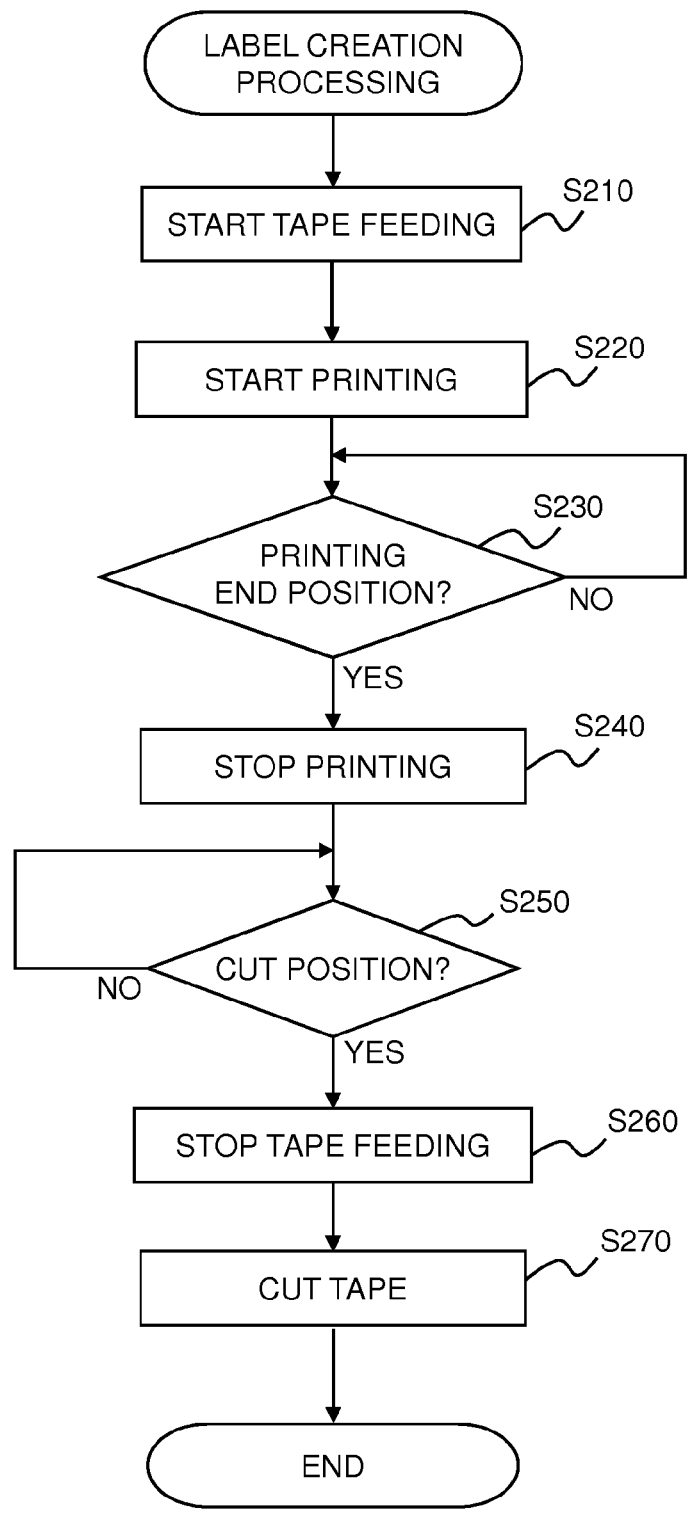
FIG. 9 is a flowchart illustrating a processing step executed by a control circuit of a label printer.

Subsequently, detailed contents of label production processing executed by the control circuit 202 of the label printer 3 will be described by using FIG. 9. A flow illustrated in FIG. 9 is started when the print data outputted from the operation terminal 2 at Step S80 is received by the label printer 3 through the communication control portion 208, for example.

First, at Step S210, the control circuit 202 outputs a control signal to the feeding motor driving circuit. As a result, the feeding motor drives the feeding roller 209 and starts feeding of the printing tape 203. Subsequently, the routine proceeds to Step S220.

At Step S220, the control circuit 202 outputs a control signal to the print-head driving circuit. As a result, a heat generating element in the print head 205 is controlled to be electrified and starts printing according to the print data received from the operation terminal 2 as described above on the printing tape 203. Subsequently, the routine proceeds to Step S230.

At Step S230, the control circuit 202 determines whether or not a transport-direction position of the printing tape 203 has arrived at a printing end position corresponding to the print data and printing has been completed by using a known method. If the printing end position is not arrived at, the determination is not satisfied (Step S230: NO), and the routine waits in a loop. If the printing end position is arrived at, the determination is satisfied (Step S230: YES), and the routine proceeds to Step S240.

At Step S240, the control circuit 202 outputs a control signal to the print-head driving circuit and stops electricity to the heat generating element of the print head 205. As a result, printing on the printing tape 203 by the print head 205 is stopped. Subsequently, the routine proceeds to Step S250.

At Step S250, the control circuit 202 determines whether or not a transport-direction position of the printing tape 203 with print has arrived at a desired tape cutting position corresponding to the print data by using a known method. Until the tape cutting position is arrived at, the determination is not satisfied (Step S250: NO), and the routine waits in a loop. If the tape cutting position is arrived at, the determination is satisfied (Step S250: YES), and the routine proceeds to Step S260.

At Step S260, the control circuit 202 outputs a control signal to the feeding motor driving circuit and stops driving of the feeding motor. As a result, rotation of the feeding roller 209 is stopped, and feeding of the printing tape 203 with print is stopped. Subsequently, the routine proceeds to Step S270.

At Step S270, the control circuit 202 outputs a control signal to the actuator for operating the cutter and has the printing tape 203 with print cut by the cutter 207. As a result, the print label L on which the printing corresponding to the print data outputted from the operation terminal 2 is applied is produced. Subsequently, this flow is finished.

<Advantageous Effects of Embodiment>

As described above, in the present embodiment, the plurality of records are included in the database DB stored in the large-capacity storage device 16 of the operation terminal 2, and in each record, the character string data is allocated to each of the plurality of fields. Then, production of the print label L on which the character string data included in the record is printed by the label printer 3 as the print object (so-called database printing) is performed.

In the present embodiment, the plurality of pieces of character string data across the plurality of records (the character string data "4A", "C110", "C111", "C112" and "C113" in the above described example) can be printed, respectively, as the plurality of print objects included in one print label L. At that time, using one reference character string data ("4A" and "C110" in the above described example) included in one reference record (the record with the record number "1" in the above described example) as a reference, contents of the other plurality of pieces of character string data applied to each of the plurality of print objects are determined by using the offset values (the offset values "0", "1", "2", and "3" in the above described example) with respect to the reference record so that the plurality of pieces of character string data across the plurality of records can be printed so as to produce one print label L.

As the result of the above, according to the present embodiment, the plurality of pieces of character string data across the plurality of records stored in the database DB can be printed as the plurality of print objects, respectively, and one print label L can be produced with a simple operation. As a result, a printed matter in which a plurality of numbers or symbols are continuously juxtaposed in one print label L such as a print label to be affixed to the terminal connection portion 31 for connecting a plurality of the cables 34 illustrated in the above described example and the like can be produced easily by the database printing. As a result, convenience for the operator can be improved.

Moreover, particularly in the present embodiment, the input screen 18 for prompting an input of the field name, the plurality of offset values and the like is displayed on the display portion 17, and at Step S20 (see FIG. 8), the field name and the offset value inputted in association with the input screen 18 displayed as above are acquired by the CPU 12.

As a result, if the operator operates/inputs the field name and the offset value of each character string data while looking at the displayed input screen 18, the plurality of pieces of character string data can be reliably determined by using the field name and the offset value.

Moreover, particularly in the present embodiment, the setting screen 21 including display of the setting of the record number range sequentially used as the reference record for producing the plurality of print labels L in the plurality of records stored in the database DB is displayed on the display portion 17.

As a result, on the displayed setting screen 21, a range from what record to what record in order is set to be used as the reference record for producing a printed matter in a large number of records included in the database DB, for example, can be visually made clear.

<Variation>

The present disclosure is not limited to the above described first embodiment but is capable of various variations within a range not departing from its gist and technical idea. Such variations will be described below in order. Portions equal to those in the above described first embodiment are given the same reference numerals, and explanation will be omitted or simplified as appropriate.

(1) If notation of connector name and notation of electronic device type are arranged with upper and lower stages reversed:

In the above described first embodiment, as illustrated in FIG. 6, the print R1 of the character string indicating the connector name is formed on the lower stage in the width direction and the print R2 of the character string indicating the model name of the electronic device is formed on the upper stage in the width direction in the print label L, but this is not limiting. That is, the print R1 and the print R2 may be arranged with upper and lower stages reversed such that, as illustrated in FIG. 10, the print R1 of the character string indicating the connector name is formed on the upper stage in the width direction and the print R2 of the character string indicating the model name of the electronic device is formed on the lower stage in the width direction.

Figure 11:
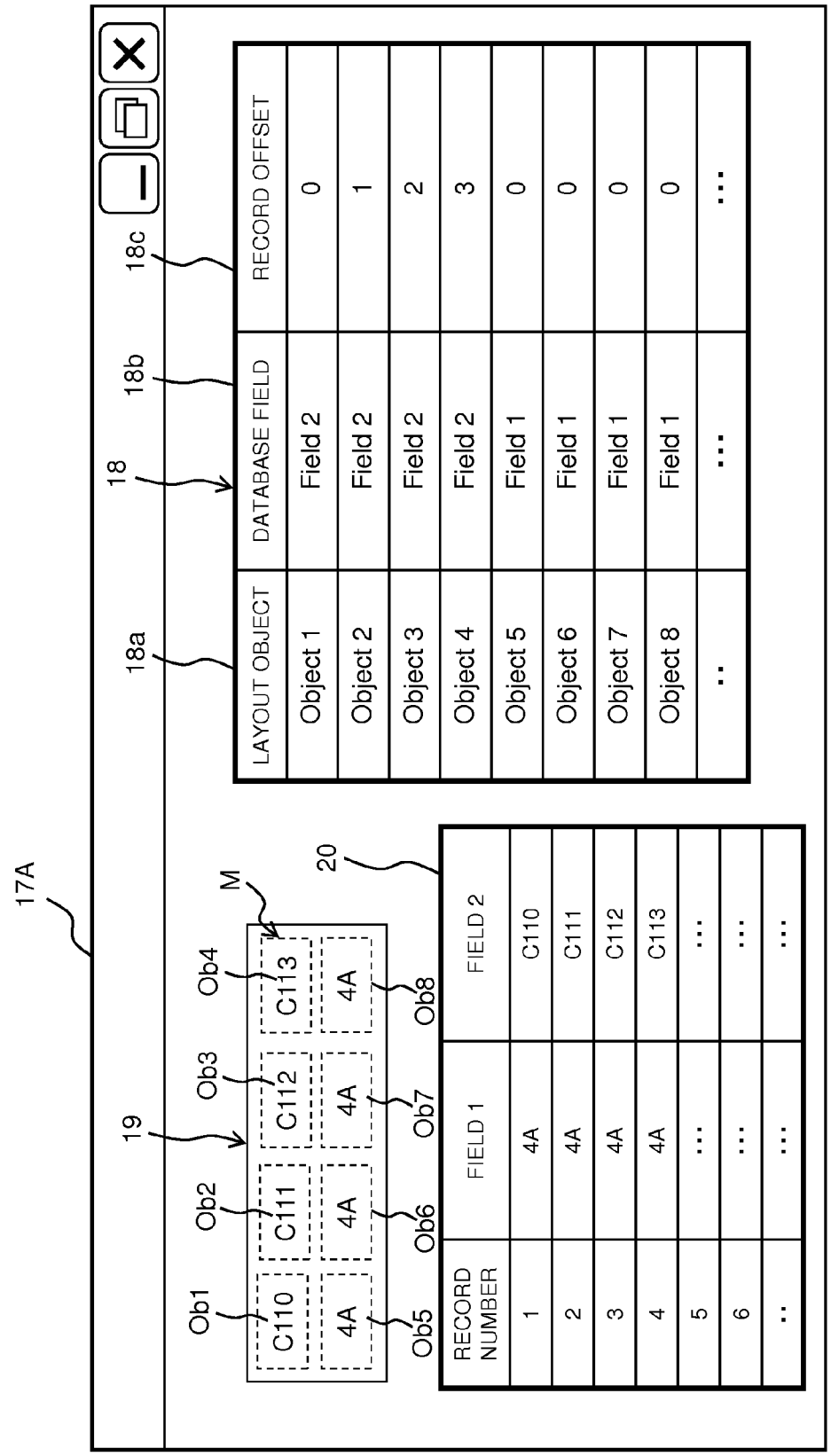
FIG. 11 is an explanatory diagram illustrating an example of the display screen including the input screen displayed on the display portion of the operation terminal.

In the present variation, the display screen 17A displayed on the display portion 17 of the operation terminal 2 for an input of the offset value and the like corresponding to the display screen 17A in FIG. 5 of the above described first embodiment is illustrated in FIG. 11.

Figure 10:
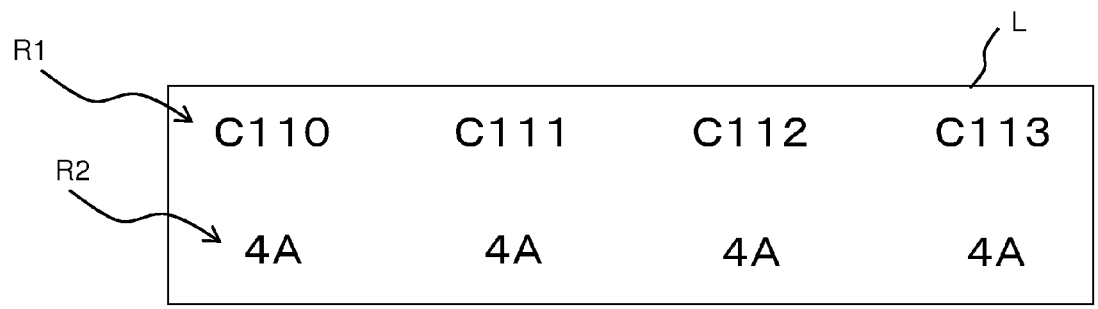
FIG. 10 is an explanatory diagram illustrating a produced print label in a variation in which character strings indicating connector names and character strings indicating types of electronic devices of print labels are arranged upside down.

In this example, in the print label L to be produced, as illustrated in FIG. 10, the character string "C110" (corresponding to the print object Ob1 of the label image M in FIG. 11), the character string "C111" (corresponding to the print object Ob2 similarly to the above), the character string "C112" (corresponding to the print object Ob3 similarly to the above), and the character string "C113" (corresponding to the print object Ob4 similarly to the above) are formed from left to right on the upper stage in the label width direction, and the character string "4A" (corresponding to the print object Ob5 similarly to the above), the character string "4A" (corresponding to the print object Ob6 similarly to the above), the character string "4A" (corresponding to the print object Ob7 similarly to the above), and the character string "4A" (corresponding to the print object Ob8 similarly to the above) are formed from left to right on the lower stage in the label width direction.

In association with the above, the operator inputs "Field2" as the database field in the database field column 18b corresponding to "Object1" of the layout object column 18a on the display screen 17A illustrated in FIG. 11. Then, the operator inputs "0" as the record offset value in the record offset column 18c corresponding to "Object1" of the layout object column 18a. Similarly, the operator inputs "Field2" as the database fields in the database field columns 18b respectively corresponding to "Object2", "Object3", and "Object4" of the layout object column 18a and also "1", "2", and "3" as the record offset values in the record offset columns 18c, respectively. By means of these inputs by the operator, the character string data "C110", "C111", "C112" and "C113" of the field 2 in each of the records with the record numbers "1" "2", "3", and "4" displayed on the database screen 20 are applied to the print objects Ob1, Ob2, Ob3, and Ob4 (the label image M on the preview screen 19 in FIG. 11 illustrates the state after this application).

Subsequently, the operator inputs "Field1" as the database field in the database field column 18b corresponding to "Object5" of the layout object column 18a. Then, the operator inputs "0" as the record offset value in the record offset column 18c corresponding to "Object5" of the layout object column 18a. Similarly, the operator inputs "Field1" as the database fields in the database field columns 18b corresponding to "Object6", "Object7", and "Object8" of the layout object column 18a and also "0" as the record offset value in the record offset column 18c, respectively. By means of these inputs by the operator, the character string data "4A" of the field 1 in the record with the record number "1" displayed on the database screen 20 is applied to the print objects Ob5, Ob6, Ob7, and Ob8, respectively (the label image M on the preview screen 19 in FIG. 11 illustrates the state after this application).

If the label production processing is executed by means of the input by the operator as above, as illustrated in FIG. 10, the print label L on which the print R1 having four character strings "C110", "C111", "C112" and "C113" indicating the connector names from the left side are formed as the plurality of print objects on the upper stage and the print R2 having the four same character strings "4A" indicating the model name of the electronic device from the left side are formed as the plurality of print objects on the lower stage can be produced.

Figure 12:
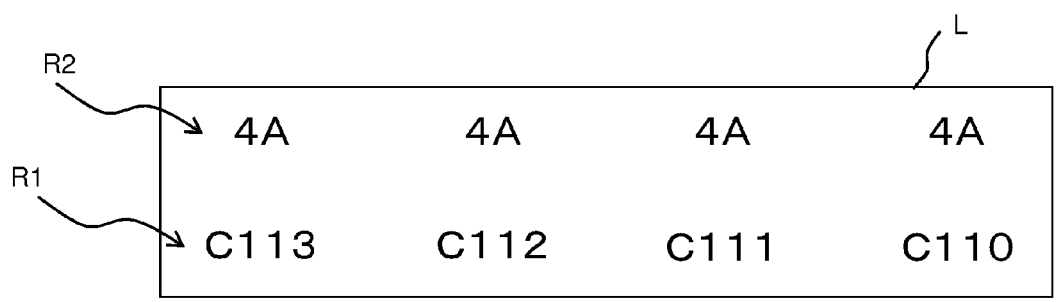
FIG. 12 is an explanatory diagram illustrating a print label produced in a variation in which a character string indicating a connector name of the print label is arranged with right and left sides reversed.

(2) If the character strings are arranged with right and left sides reversed:

In the above described first embodiment, as illustrated in FIG. 6, the print R1 on the lower stage in the width direction of the print label L has the four character strings indicating the connector names juxtaposed from the left side as "C110", "C111", "C112" and "C113", but as illustrated in FIG. 12, right-and-left arrangement of these four character strings can be reversed.

Figure 13:
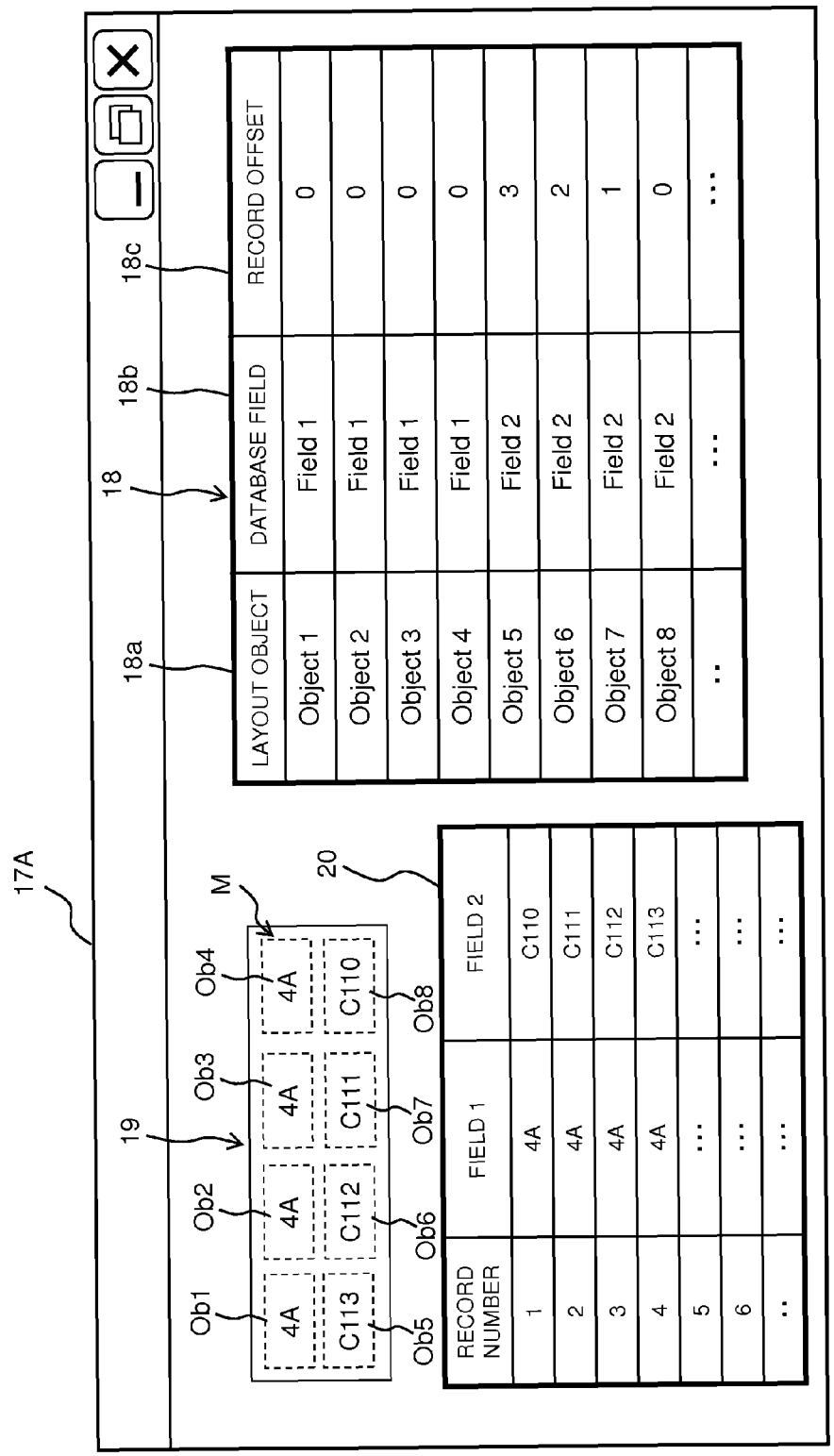
FIG. 13 is an explanatory diagram illustrating an example of the display screen including the input screen displayed on the display portion of the operation terminal.

In the present variation, the display screen 17A displayed on the display portion 17 of the operation terminal 2 for an input of the offset value and the like corresponding to the display screen 17A in FIG. 5 of the above described first embodiment is illustrated in FIG. 13.

In this example, in the print label L to be produced, as illustrated in FIG. 12, the character string "4A" (corresponding to the print object Ob1 of the label image M in FIG. 13), the character string "4A" (corresponding to the print object Ob2 similarly to the above), the character string "4A" (corresponding to the print object Ob3 similarly to the above), and the character string "4A" (corresponding to the print object Ob4 similarly to the above) are formed from left to right on the upper stage in the label width direction, and the character string "C113" (corresponding to the print object Ob5 similarly to the above), the character string "C112" (corresponding to the print object Ob6 similarly to the above), the character string "C111" (corresponding to the print object Ob7 similarly to the above), and the character string "C110" (corresponding to the print object Ob8 similarly to the above) are formed from left to right on the lower stage in the label width direction.

In association with the above, the operator inputs "Field1" as the database field in the database field column 18b corresponding to "Object1" of the layout object column 18a on the display screen 17A illustrated in FIG. 13. Then, the operator inputs "0" as the record offset value in the record offset column 18c corresponding to "Object1" of the layout object column 18a. Similarly, the operator inputs "Field1" as the database fields in the database field columns 18b corresponding to "Object2", "Object3", and "Object4" of the layout object column 18a and also "0" as the record offset values in the record offset column 18c, respectively. By means of these inputs by the operator, the character string data "4A" of the field 1 in the record with the record number "1" displayed on the database screen 20 is applied to the print objects Ob1, Ob2, Ob3, and Ob4, respectively (the label image M on the preview screen 19 in FIG. 13 illustrates the state after this application).

Subsequently, the operator inputs "Field2" as the database field in the database field column 18b corresponding to "Object5" of the layout object column 18a. Then, the operator inputs "3" as the record offset value in the record offset column 18c corresponding to "Object5" of the layout object column 18a. Similarly, the operator inputs "Field2" as the database fields in the database field columns 18b corresponding to "Object6", "Object7", and "Object8" of the layout object column 18a and also "2", "1", and "0" as the record offset values in the record offset columns 18c, respectively. By means of these inputs by the operator, the character string data "C113", "C112", "C111", and "C110" of the field 2 in each of the records with the record numbers "4", "3", "2", and "1" displayed on the database screen 20 are applied to the print objects Ob5, Ob6, Ob7, and Ob8, respectively (the label image M on the preview screen 19 in FIG. 13 illustrates the state after this application).

If the label production processing is executed by means of the input by the operator as above, as illustrated in FIG. 12, the print label L on which the print R2 having the four same character strings "4A" indicating the model name of the electronic device from the left side are formed as the plurality of print objects on the upper stage and the print R1 having the four character strings "C113", "C112", "C111", and "C110" indicating the connector names from the left side are formed as the plurality of print objects on the lower stage can be produced.

<Second Embodiment>

A second embodiment of the present disclosure will be described by using FIGS. 14 to 16. The present embodiment is an embodiment when a record range of the reference record in the above described setting screen 21 is set for a plurality of records. The same reference numerals are given to portions equal to those of the above described first embodiment and its variations and the explanation will be omitted or simplified as appropriate.

<Setting Screen>

Figure 14:
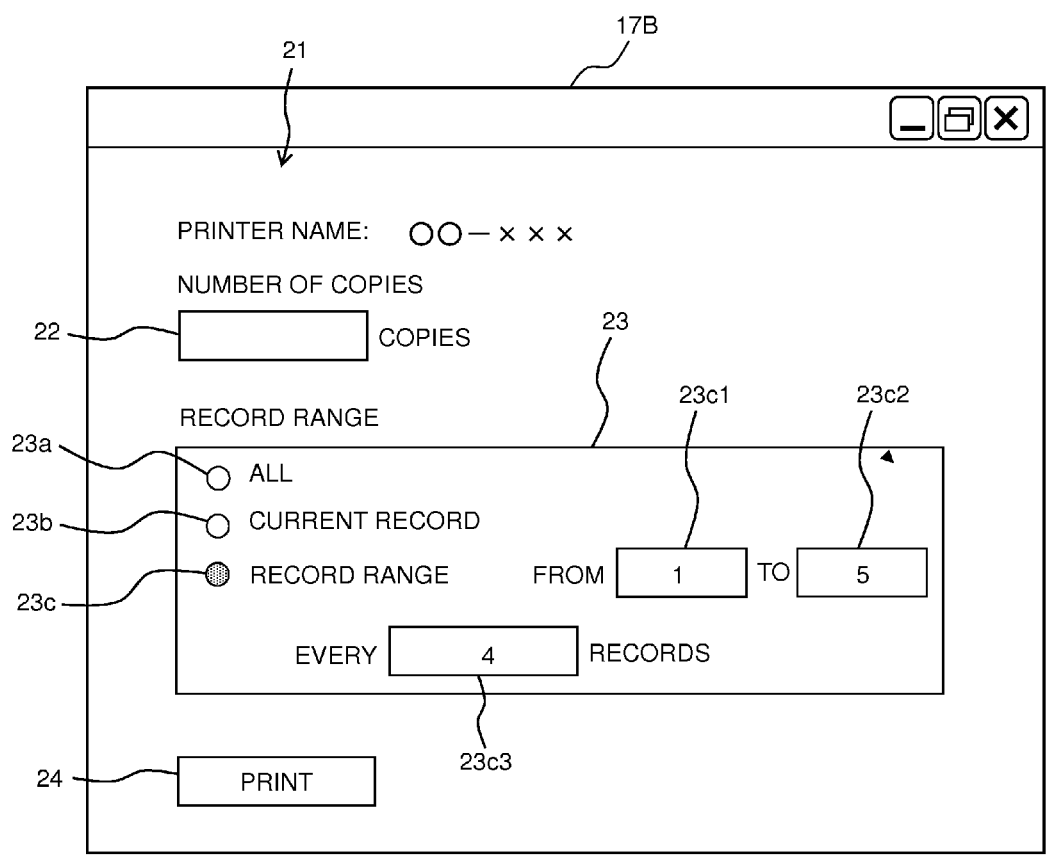
FIG. 14 is an explanatory diagram illustrating an example of a display screen including a setting screen displayed on a display portion of an operation terminal according to a second embodiment of the present disclosure.
Figure 15A:
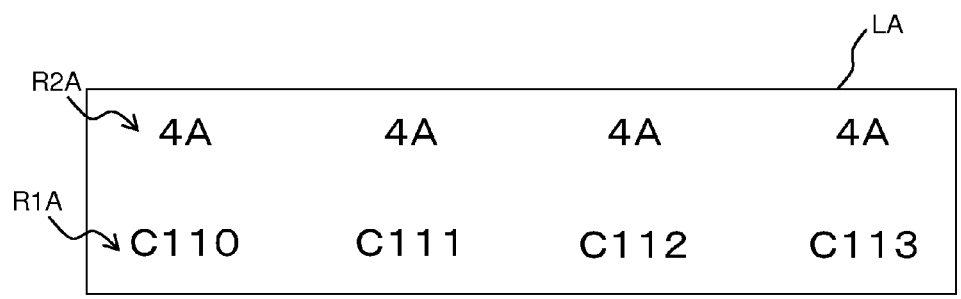
FIG. 15A is an explanatory diagram illustrating a produced print label.
Figure 15B:
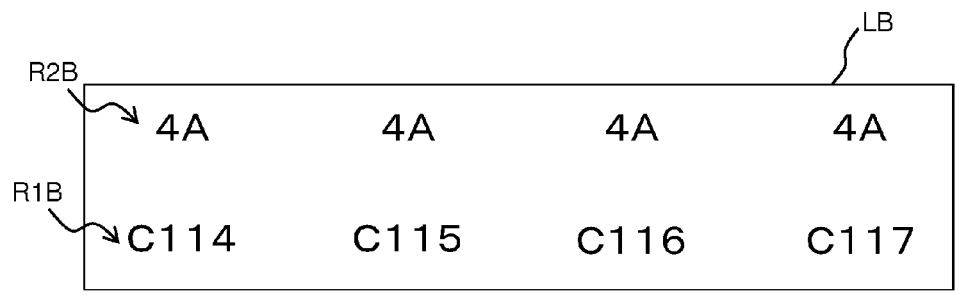
FIG. 15B is an explanatory diagram illustrating a produced print label.

The display screen 17B displayed on the display portion 17 of the operation terminal 2 in the second embodiment (including the setting screen 21) is illustrated in FIG. 14. In this setting screen 21, a record skip number column 23c3 into which the number of skips of the records is to be inputted is added to the record number range setting column 23 in the setting screen 21 of the first embodiment illustrated in FIG. 7. The other parts are similar to those in the setting screen 21 in the first embodiment.

The meaning of the record skip number column 23c3 will be described below. That is, in the example illustrated in FIG. 14, "1" is inputted into the input column 23c1 by the operation input by the operator using the operation portion 14, and a numeral value "5" is inputted into the input column 23c2, respectively. As a result, among the plurality of records of the database DB, the record with the record number "1" to the record with the record number "5" can be used as the reference records.

Here, as described above, in the present disclosure, a plurality of pieces of the character string data across the plurality of records (four records with the record numbers "1", 2", "3", and "4" in the above described example) are printed in one print label L. Therefore, in order to produce a plurality of the print labels L having a wide record range of the reference record as above, unlike the case in which the character string data of only one record is printed in one print label L, the record to be the reference record in the print label L to be produced subsequent to the first one print label L is not the record (the record with the record number "2" in the above described example) in the order subsequent to the reference record (the record with the record number "1" in the above described example) when the first one print label L was produced. That is, the record will be a record (a record with the record number "5" in the above described example) in the order acquired by adding the number of records (4 in the above described example) of the plurality of records (the records with the record numbers "1", "2", "3", and "4" in the above described example) to the reference record (the record with the record number "1" in the above described example) when the first one print label L was produced. That is, skip of the reference record is required in the database printing in which printing is performed in the order of records. In the present embodiment, the record skip number column 23c3 into which the number of skips is inputted is disposed in response to that. In this example, a numeral value "4" corresponding to the above is inputted by means of the operation input by the operator using the operation portion 14 (the print label L in which a part of contents is intentionally overlapped with the first print label L can be also produced by inputting the numeral values "2" or "3").

In the setting state illustrated in the above described FIG. 14 (the contents of the input screen are assumed to be the same as FIG. 5), when the operator operates the printing button 24, the print data for the database printing with the record number "1" as the reference record is created, first. That is, similarly to the first embodiment, the print data including the character strings "4A", "4A", "4A", and "4A" and the character strings "C110", "C111", "C112", and "C113" is created and the print data is outputted to the printer 3. Then, a print label LA illustrated in FIG. 15A on which the print R1 (including the character strings "4A", "4A", "4A", and "4A") and the print R2 (including the character strings "C110", "C111", "C112", and "C113") are printed is produced by the printer 3.

Subsequently to the creation of the print data for the print label LA, print data for the database printing with the record number "5" as the reference record is created in association with the skip number "4".

That is, to the above described print objects Ob1, Ob2, Ob3, and Ob4 (see FIG. 5), the character string data "C 114", "C115", "C116" and "C 117" of the field 2 in each of the records with the record numbers "5", "6", "7", and "8" displayed on the database screen 20 are applied (see FIGS. 5 and 3). To the print objects Ob5, Ob6, Ob7, and Ob8, the character string data "4A" of the field 1 in the record with the record number "5" displayed on the database screen 20 is applied, respectively (see FIGS. 5 and 3). As a result, similarly to the above, the print data including the character string data "4A", "4A", "4A", and "4A" and the character strings "C114", "C115", "C116", and "C117" is created, and the print data is outputted to the printer 3. Then, a print label LB illustrated in FIG. 15B on which the print R1 (including the character strings "4A", "4A", "4A", and "4A") and the print R2 (including the character strings "C114", "C115", "C116", and "C117") are printed is produced by the printer 3.

Figure 8:
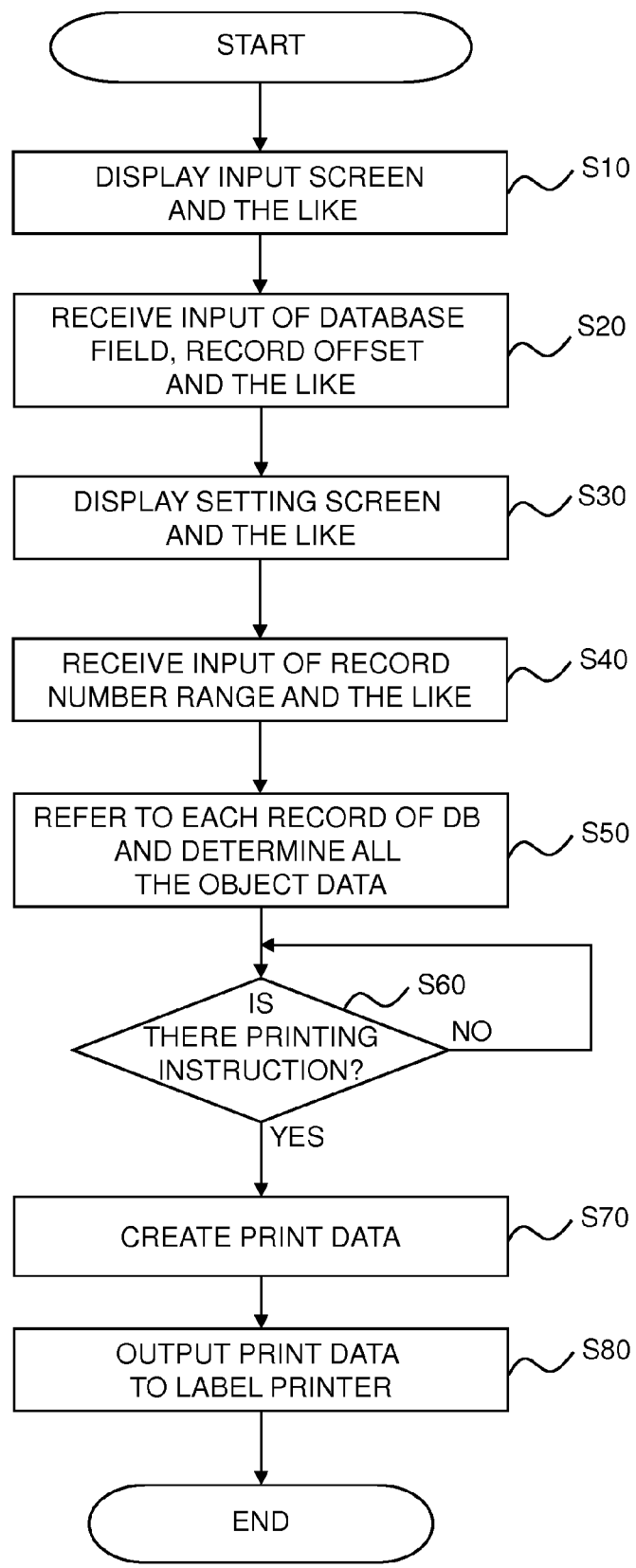
FIG. 8 is a flowchart illustrating a processing step executed by a CPU of the operation terminal.

In order to realize the above processing, a processing procedure of the printed matter producing method executed by the CPU 12 of the operation terminal 2 in the present embodiment on the basis of the printed matter producing program is the same as the above described processing in FIG. 8. At that time, at Step S40 subsequent to the above described Step S30, the record skip number inputted by the operator is received.

An example of the terminal connection portion of the electronic device to which the print labels LA and LB produced as above are affixed is illustrated in FIG. 16 corresponding to FIG. 4.

As illustrated in FIG. 16, in the present embodiment, a terminal connection portion 31A and a terminal connection portion 31B are disposed on an upper part and a lower part of the electronic device 30, respectively.

The terminal connection portion 31A on the upper stage is similar to the terminal connection portion 31 of the first embodiment. That is, each of the jacks 32 of the four connectors 35 is arranged in the width direction of the electronic device 30, and each of the plugs 33 of the corresponding four connectors 35 is connected thereto. Immediately above the row of the four jacks 32 of the terminal connection portion 31A, the single print label LA which is long in the width direction of the electronic device 30 is affixed. A print R1A of the print label LA includes four character strings "C110", "C111", "C112", and "C113" indicating the names of the connectors 35 as the plurality of (four in this example) print objects similarly to the print label L. Moreover, a print R2A of the print label LA includes four character strings "4A" expressing the model name of the electronic device as the plurality of (four in this example) print objects. That is, it indicates that the connectors 35 with the above described names "C110", "C111", "C112", and "C113" are all connectors of the electronic device with the model name "4A".

Regarding the terminal connection portions 31B on the lower stage, similarly to the above described terminal connection portion 31A, each of the jacks 32 of the four connectors 35 is arranged in the width direction of the electronic device 30, and each of the plugs 33 of the corresponding four connectors 35 is connected thereto. Immediately above the row of the four jacks 32 of the terminal connection portion 31B, the single print label LB which is long in the width direction of the electronic device 30 is affixed. A print R1B of the print label LB includes four character strings "C114", "C115", "C116", and "C117" indicating the names of the connectors 35 as the plurality of (four in this example) print objects similarly to the print label L. Moreover, a print R2B of the print label LB includes four character strings "4A" expressing the model name of the electronic device as the plurality of (four in this example) print objects. That is, it indicates that the connectors 35 with the above described names "C114", "C115", "C116", and "C117" are all connectors of the electronic device with the model name "4A".

In the second embodiment configured as described above, too, the advantages similar to those in the first embodiment are obtained. In addition to that, in the record skip number column 23c3 of the setting screen 21, the number of skip records when the above described skip is performed can be also visually made clear.

The skip record number may be automatically set in accordance with the number of print objects included in one print label L and displayed on the setting screen 21. In this case, in accordance with printing of the plurality of pieces of character string data across the plurality of records in one print label L, the number of records to be skipped can be automatically set. As a result, convenience of the operator can be further improved.

In the above, the arrows shown in FIG. 2 illustrate an example of flows of signals and do not limit the flow direction of the signals.

Moreover, the flowcharts illustrated in FIGS. 8 and 9 do not limit the present disclosure to the step indicated in the flows, but addition/deletion or change of orders and the like of the steps can be made within a range not departing from the gist and technical idea of the disclosure.

Moreover, other than those described above, the above described embodiment or methods by the variations may be combined and used as appropriate.

What is claimed is:

1. A non-transitory computer-readable recording medium, storing a printed matter producing program for executing steps on a computer of an operation terminal, said operation terminal that is connected to a printed matter producing apparatus configured to produce one printed matter comprising a plurality of print objects by performing print on the basis of print data on a print-receiving medium being fed and is comprising a memory configured to store a database comprising a plurality of records each allocating character string data to a plurality of fields and each having a record number, a display device, and said steps comprising:
    an information acquiring that acquires identification information of said field comprising a reference character string data included in one reference record which becomes an application reference to a plurality of pieces of print object data applied to a plurality of print objects to be printed on said printed matter, respectively, and that acquires a plurality of offset values each indicating an offset of said record number of said plurality of pieces of print object data with respect to said record number of said reference character string data;

a reference character string data acquiring that acquires said reference character string data from said database by using said identification information acquired in said information acquiring;

a record number determining that determines sequentially the record number of the record having data to be obtained by applying said offsets respectively indicated by said plurality of offset values acquired in said information acquiring to said record number of said reference record, sequentially;

an object data determining that determines said plurality of pieces of print object data by said character string data included in the record having the record number determined in said record number determining;

a print data creating that creates said print data for printing said printed matter comprising said plurality of print objects on the basis of said plurality of pieces of print object data determined in said object data determining; and a print data outputting that outputs said print data created in said print data creating to said printed matter producing apparatus.

2. The recording medium according to claim 1, wherein:

said computer is further caused to execute an input screen displaying that displays an input screen for prompting inputs of said identification information and said plurality of offset values on said display device; and in said information acquiring, said identification information and said plurality of offset values inputted in accordance with said input screen displayed in said input screen displaying are acquired.

3. The recording medium according to claim 1, wherein:

said computer is further caused to execute a setting screen displaying that displays a setting screen on said display device, said setting screen comprising display of setting of a record number range indicating each of record numbers sequentially used as said reference record for producing a plurality of said printed matters among said plurality of records stored in said database and display of a skip record number to be skipped when each of records that the record number of the record is included in said record number range is sequentially used as said reference record.

4. The recording medium according to claim 3, wherein:

said skip record number displayed on said setting screen in said setting screen displaying is automatically set in accordance with the number of said print objects included in said one printed matter.

5. A method of producing a printed matter executed by an operation terminal that is connected to a printed matter producing apparatus configured to produce one printed matter comprising a plurality of print objects by performing print on the basis of print data on a print-receiving medium being fed and is configured to store a database comprising a plurality of records each allocating character string data to a plurality of fields and each having a record number, said method comprising:

an information acquiring that acquires identification information of said field comprising a reference character string data included in one reference record which becomes an application reference to a plurality of pieces of print object data applied to a plurality of print objects to be printed on said printed matter, respectively, and that acquires a plurality of offset values each indicating an offset of said record number of said plurality of pieces of print object data with respect to said record number of said reference character string data;

a reference character string data acquiring that acquires said reference character string data from said database by using said identification information acquired in said information acquiring;

a record number determining that determines sequentially the record number of the record having data to be obtained by applying said offsets respectively indicated by said plurality of offset values acquired in said information acquiring to said record number of said reference record, sequentially;

an object data determining that determines said plurality of pieces of print object data by said character string data included in the record having the record number determined in said record number determining;

a print data creating that creates said print data for printing said printed matter comprising said plurality of print objects on the basis of said plurality of pieces of print object data determined in said object data determining; and a print data outputting that outputs said print data created in said print data creating to said printed matter producing apparatus.

* * * * *